United States Patent
Lee et al.

(10) Patent No.: US 10,187,903 B2
(45) Date of Patent: Jan. 22, 2019

(54) METHOD FOR TRANSCEIVING SIGNAL FOR DEVICE-TO-DEVICE (D2D) COMMUNICATION AND APPARATUS THEREFOR IN WIRELESS COMMUNICATION SYSTEM

(71) Applicant: LG Electronics Inc., Seoul (KR)

(72) Inventors: Seungmin Lee, Seoul (KR); Hanbyul Seo, Seoul (KR); Byounghoon Kim, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/329,040

(22) PCT Filed: Jul. 29, 2015

(86) PCT No.: PCT/KR2015/007939
§ 371 (c)(1),
(2) Date: Jan. 25, 2017

(87) PCT Pub. No.: WO2016/018075
PCT Pub. Date: Feb. 4, 2016

(65) Prior Publication Data
US 2017/0215203 A1 Jul. 27, 2017

Related U.S. Application Data

(60) Provisional application No. 62/030,567, filed on Jul. 29, 2014, provisional application No. 62/031,864, filed on Aug. 1, 2014.

(51) Int. Cl.
*H04L 1/18* (2006.01)
*H04J 11/00* (2006.01)
(Continued)

(52) U.S. Cl.
CPC ......... *H04W 72/1278* (2013.01); *H04J 11/00* (2013.01); *H04W 72/04* (2013.01);
(Continued)

(58) Field of Classification Search
CPC ... H04W 76/023; H04W 72/12; H04W 8/005; H04W 72/04; H04W 72/0446;
(Continued)

(56) References Cited

U.S. PATENT DOCUMENTS 9,526,064 B2 * 12/2016 Kim .................. H04W 24/10
9,763,199 B2 * 9/2017 Pelletier ............ H04W 52/146
(Continued)

FOREIGN PATENT DOCUMENTS

KR 1020130019426 A 2/2013
KR 1020130065225 A 6/2013
(Continued)

*Primary Examiner* — George Eng
*Assistant Examiner* — Umair Ahsan
(74) *Attorney, Agent, or Firm* — Dentons US LLP

(57) ABSTRACT

The present invention discloses a method for receiving a D2D signal of a D2D reception terminal in a wireless communication system. Specifically, the method comprises steps of: receiving a resource pool configuration for D2D communication; and, in accordance to whether or not under the fall-back mode of enhanced interference management for traffic adaptation (eIMTA), receiving a D2D signal from a D2D transmission terminal by means of at least one from among a first wireless resource or a second wireless resource within the resource pool configuration, wherein the first wireless resource is a wireless resource for which the use thereof is configured according to the system information block (SIB) uplink-downlink configuration and is not reconfigured by means of hierarchical signaling, and the second wireless resource is a wireless resource for which the use thereof according to the SIB uplink-downlink configuration
(Continued)

is reconfigured by means of hierarchical signaling in the eIMTA mode.

8 Claims, 11 Drawing Sheets

(51) Int. Cl.
    *H04W 72/04*     (2009.01)
    *H04W 72/12*     (2009.01)

(52) U.S. Cl.
    CPC ....... *H04W 72/0406* (2013.01); *H04W 72/12* (2013.01); *H04W 72/1215* (2013.01); *H04L 1/1812* (2013.01)

(58) Field of Classification Search
    CPC ..... H04W 84/18; H04W 72/14; H04W 88/02; H04W 92/18; H04L 5/1469; H04L 1/1896; H04L 5/14; H04L 1/1854
    See application file for complete search history.

(56) References Cited

U.S. PATENT DOCUMENTS

| | | | |
|---|---|---|---|
| 2013/0322413 A1* | 12/2013 | Pelletier | H04W 72/1289 370/336 |
| 2014/0036718 A1 | 2/2014 | Gao et al. | |
| 2015/0085719 A1* | 3/2015 | Yin | H04L 1/1896 370/280 |
| 2016/0112858 A1* | 4/2016 | Nguyen | H04W 8/005 370/329 |
| 2016/0174175 A1* | 6/2016 | Adachi | H04W 56/00 370/350 |

FOREIGN PATENT DOCUMENTS

| | | |
|---|---|---|
| KR | 1020140068088 A | 6/2014 |
| WO | 2013030773 A1 | 3/2013 |
| WO | 2014/044081 A1 | 3/2014 |

\* cited by examiner

FIG. 2
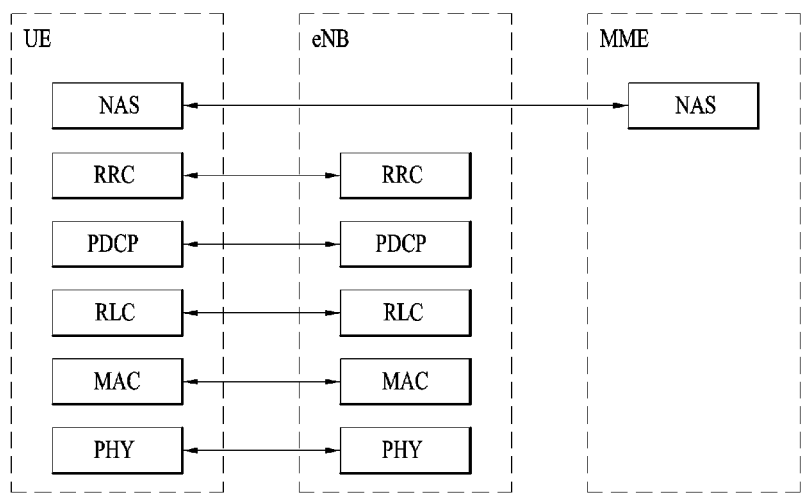
(a) Control-plane protocol stack
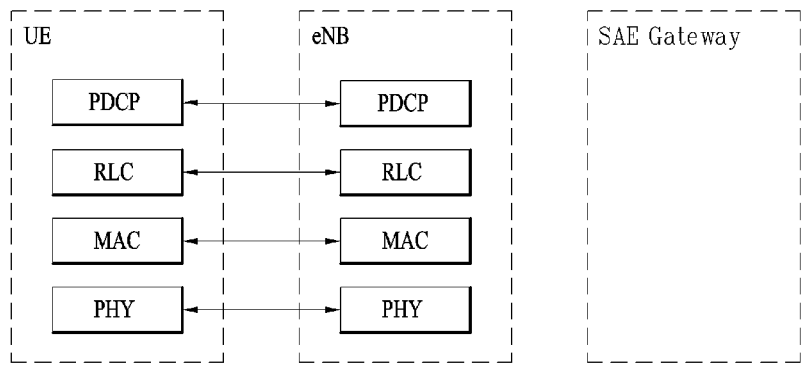
(b) User-plane protocol stack FIG. 9
(a) 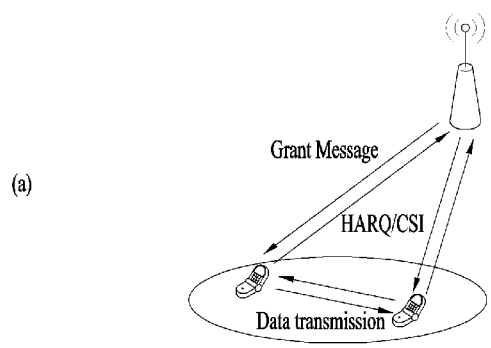
(b) 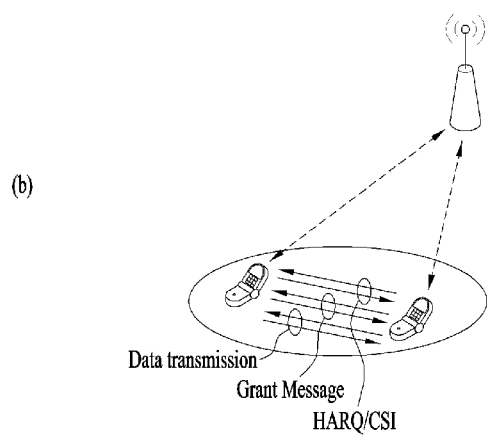

METHOD FOR TRANSCEIVING SIGNAL FOR DEVICE-TO-DEVICE (D2D) COMMUNICATION AND APPARATUS THEREFOR IN WIRELESS COMMUNICATION SYSTEM

This application is a 35 USC § 371 National Stage entry of International Application No. PCT/KR2015/007939, filed on Jul. 29, 2015, and claims priority to U.S. Provisional Application Nos. 62/030,567, filed Jul. 29, 2014, and 62/031,864, filed Aug. 1, 2014, which are hereby incorporated by reference in their entireties for all purposes as if fully set forth herein.

TECHNICAL FIELD

The present invention relates to a wireless communication system, and more particularly, to a method for transceiving signals for device-to-device (D2D) communication in a wireless communication system and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

The UE reports state information of a current channel to the eNB periodically and/or aperiodically to assist the eNB to efficiently manage the wireless communication system. Since the reported channel state information may include results calculated in consideration of various situations and accordingly, a more efficient reporting method is needed.

DISCLOSURE OF THE INVENTION

Technical Task

Based on the above-described discussion, a method for transceiving signals for device-to-device (D2D) communication in a wireless communication system and apparatus therefor are proposed in the present invention.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In one aspect of the present invention, provided is a method of transmitting resource information for D2D (device-to-device) communication in a wireless communication system, the method performed by a D2D transmission UE (user equipment) and including: receiving a resource pool configuration for the D2D communication; and transmitting, to a D2D reception UE, resource information indicating a resource for first D2D signal transmission from the D2D reception UE to the D2D transmission UE.

Additionally, when the D2D transmission UE performs the first D2D signal transmission, the resource information may indicate a radio resource that the D2D transmission UE can receive.

Additionally, the resource information may indicate a first radio resource for the first D2D signal transmission, the first radio resource may be configured in a resource pool except a second radio resource, and the second radio resource may correspond to a radio resource used for second D2D signal transmission from the D2D transmission UE to the D2D reception UE.

Additionally, the resource information may be mapped to a resource pool for scheduling assignment.

Additionally, the resource information may be mapped to a resource pool for D2D data.

Additionally, the resource information may be transmitted using a predetermined channel and a resource may be determined based on a D2D UE ID (identifier).

Additionally, the resource information may be configured to be masked with CRC (cyclic redundancy check) based on a D2D UE ID.

Additionally, the resource information may be configured to contain a filed associated with ID information of the D2D transmission UE.

Additionally, the resource information may be configured to be transmitted with control information for at least one of the first D2D signal transmission and the second D2D signal transmission.

In another aspect of the present invention, provided is a D2D (device-to-device) transmission UE (user equipment) for transmitting resource information for D2D communication in a wireless communication system, including a radio frequency unit and a processor. In this case, the processor may be configured to receive a resource pool configuration for the D2D communication and transmit, to a D2D reception UE, resource information indicating a resource for first D2D signal transmission from the D2D reception UE to the D2D transmission UE.

Advantageous Effects

According to embodiments of the present invention, resource information for D2D communication can be efficiently transmitted and received in a wireless communication system.

Effects obtainable from the present invention are non-limited by the above-mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates structures of control and user planes of a radio interface protocol between a user equipment and E-UTRAN based on 3GPP radio access network standard.

FIG. 9 illustrates D2D (UE-to-UE) communication.

BEST MODE FOR INVENTION

Figure 1:
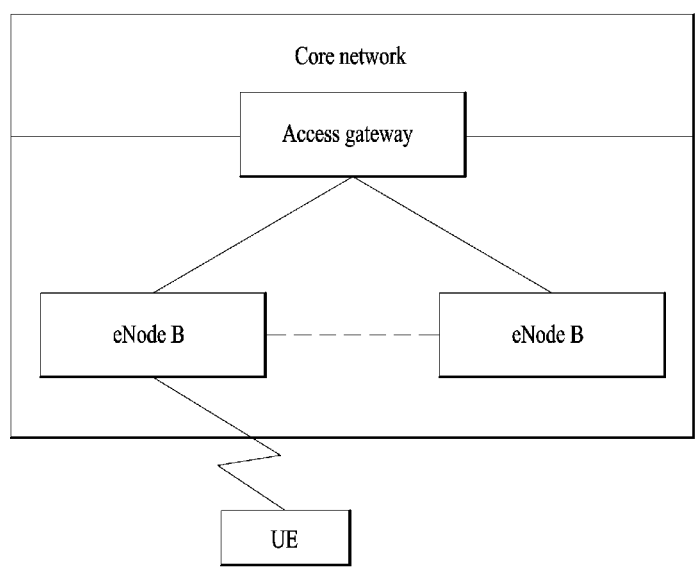
FIG. 1 is a schematic diagram of an E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
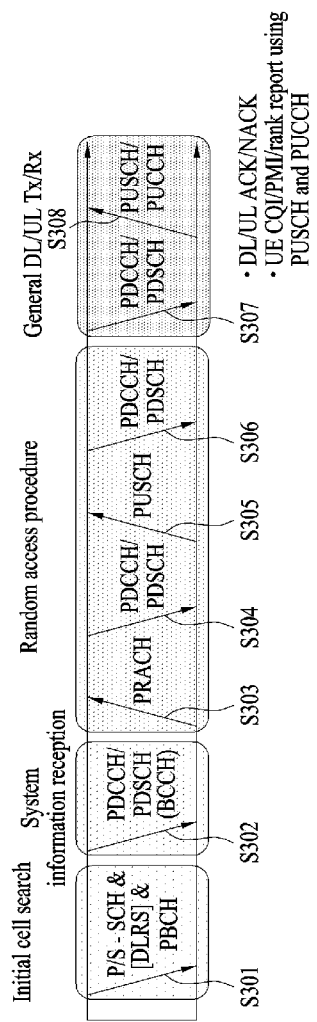
FIG. 3 illustrates physical channels used in a 3GPP LTE system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
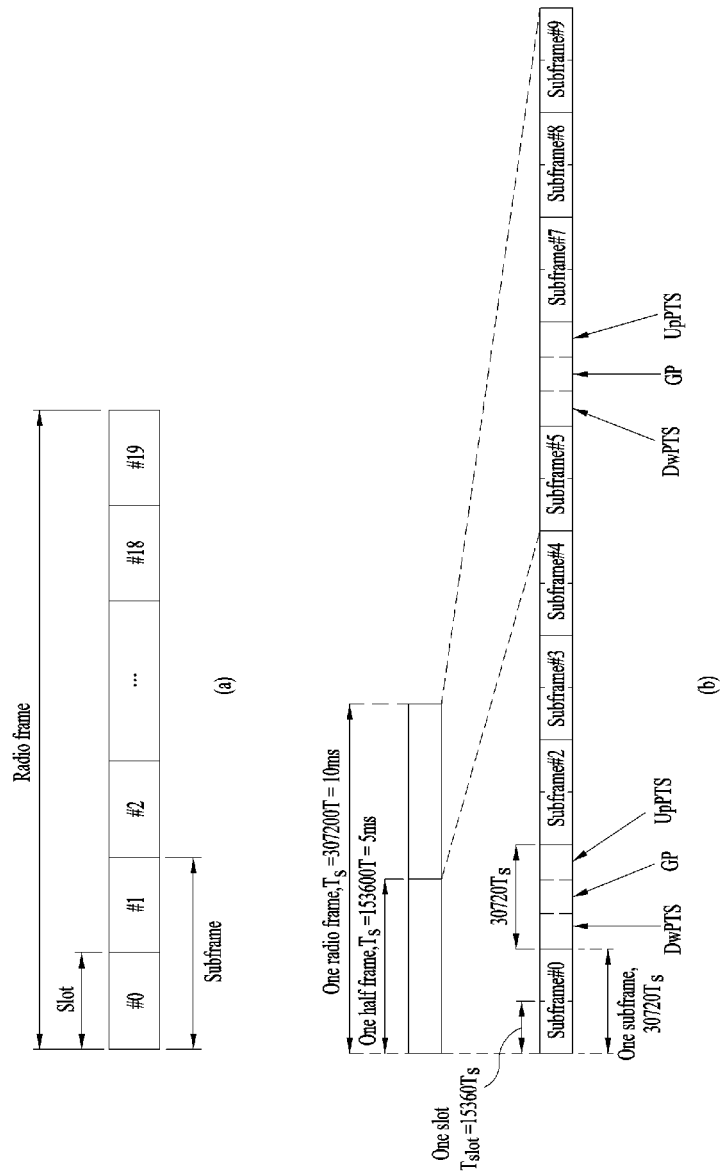
FIG. 4 illustrates a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols.

At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
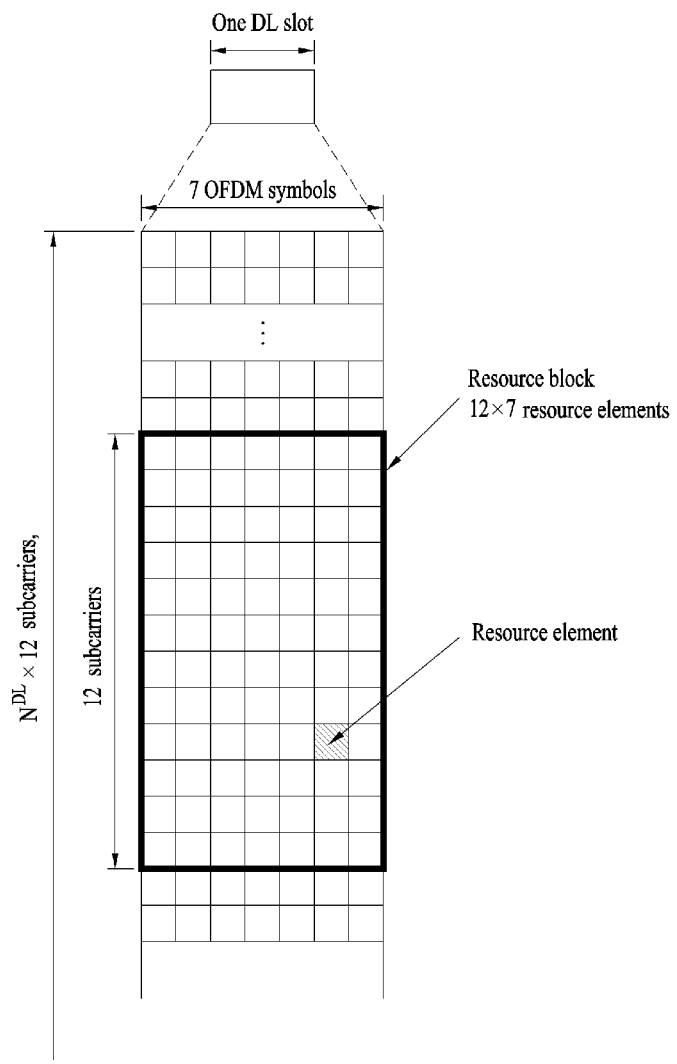
FIG. 5 illustrates a resource grid for a downlink slot.

FIG. 5 illustrates a resource grid for a downlink slot.

Referring to FIG. 5, a DL slot includes $N_{symb}^{DL}$ OFDM symbols in a time domain and $N_{RB}^{DL}$ resource blocks in a frequency domain. Since each of the resource blocks includes $N_{SC}^{RB}$ subcarriers, the DL slot includes $N_{RB}^{DL} \times N_{SC}^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N_{symb}^{DL} \times N_{SC}^{RB}$ resource elements. The number ($N_{RB}^{DL}$) of resource blocks included in the DL slot depends on a DL transmission bandwidth configured in a cell.

Figure 6:
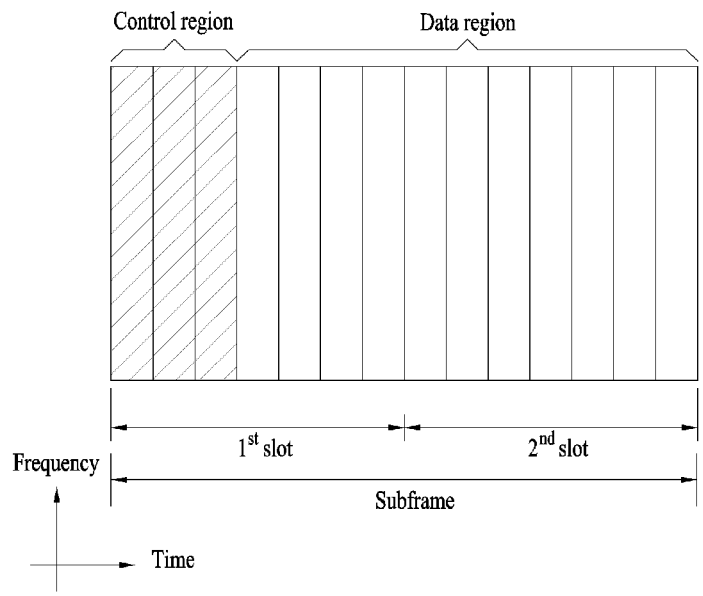
FIG. 6 illustrates a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
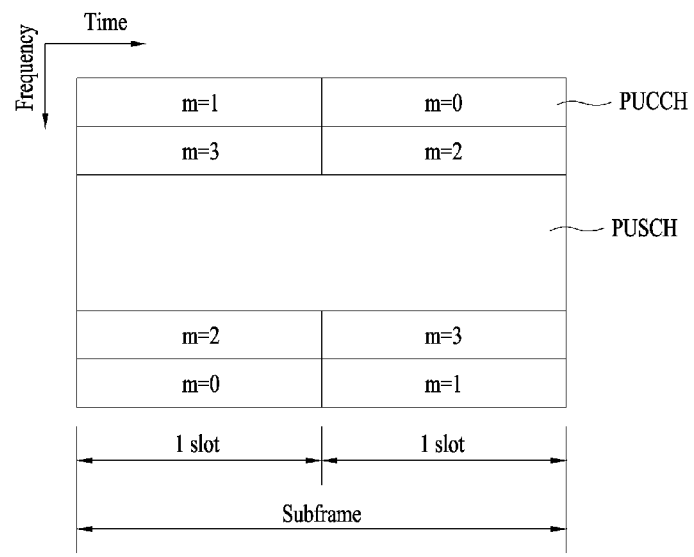
FIG. 7 illustrates a structure of an uplink subframe used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Figure 8:
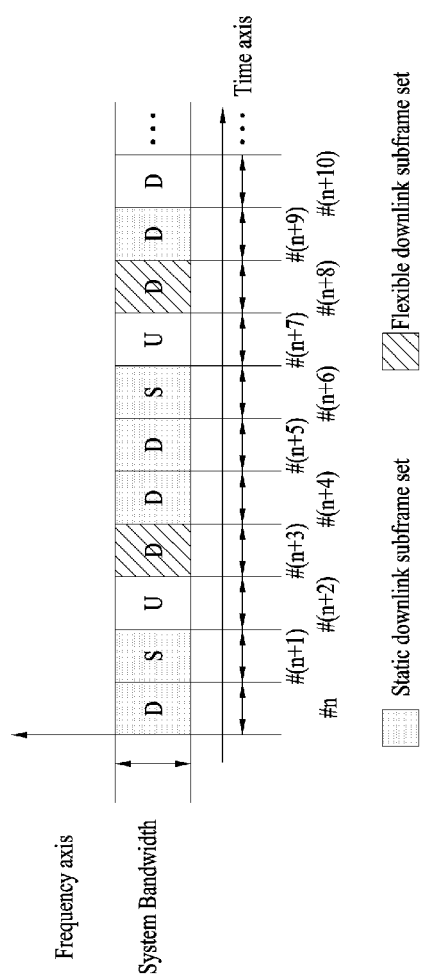
FIG. 8 illustrates a case in which a specific cell uses some existing uplink resources for downlink communication in a TDD system by changing usage of the uplink resources due to increase in downlink loads of the system.

FIG. 8 illustrates a case in which a specific cell uses some existing uplink resources for downlink communication in a TDD system by changing usage of the uplink resources due to increase in downlink loads of the system. In FIG. 8, a UL/DL configuration established through an SIB is assumed to be UL/DL #1 (i.e., DSUUDDSUUD). In addition, it can be seen that UL SF #(n+3) and UL SF #(n+8) are changed for downlink communication through a pre-configured signal (e.g., a physical/higher layer signal or a system information signal).

Hereinafter, D2D (UE-to-UE) communication will be described.

D2D communication schemes can be mainly divided into a scheme supported by a network/coordination station (e.g., base station) and a scheme not supported by the network/coordination station.

Referring to FIG. 9, FIG. 9 (a) illustrates a scheme in which the network/coordination station intervenes in transmission and reception of control signals (e.g., grant message), HARQ, channel state information, etc. and user equipments that perform D2D communication transmit and receive data only. On the other hand, FIG. 9 (b) illustrates a scheme in which the network provides minimum information (e.g., D2D connection information available in a corresponding cell) only but the user equipments that perform D2D communication establish links and transceive data.

Based on the above-mentioned discussion, a method for solving the following issues #1 to #4 in a situation that D2D (device-to-device) communication and eIMTA (enhanced interference management for traffic adaptation) operation (i.e., dynamic change operation of radio resource usage) is simultaneously applied will be hereinafter described.

Here, the D2D communication means that a UE directly communicates with another UE through a wireless channel. In addition, although a UE means a user's terminal, a network entity such as an eNB may be regarded as the UE if the network entity transmits/receives signals according to a communication method between UEs. Further, the eIMTA operation means that a cell changes usage of a radio resource depending on its load state and then use the radio resource.

For convenience of description, a UE configured or signaled to simultaneously perform the D2D communication and eIMTA operation is defined as "DeI-UE", and a cell that simultaneously manages the D2D communication and eIMTA operation is defined as "DeI-Cell". Additionally, a DeI-UE transmitting a D2D signal is defined as "D2D TX DeI-UE", and a DeI-UE receiving a D2D signal is defined "D2D RX DeI-UE". Further, unless specified otherwise, a D2D TX UE indicates a normal D2D UE transmitting a D2D signal (i.e., the D2D TX DeI-UE is also included) and a D2D RX UE indicates a normal D2D UE receiving a D2D signal (i.e., the D2D RX DeI-UE is also included).

Issue #1: Issue regarding a resource pool configuration for DeI-UE's D2D signal transmission/reception operation. In the following description, a resource pool associated with D2D signal transmission operation is defined as "D2D SIG TX RePool" and a resource pool associated with D2D signal reception operation is defined as "D2D SIG RX RePool" for convenience of description.

Issue #2: Issue regarding D2D signal transmission/reception at a resource position set as D2D SIG TX RePool or D2D SIG RX RePool when a DeI-UE operates in eIMTA fallback mode. Hereinafter, the eIMTA fallback mode is defined as "eIMTA FMode".

Issue #3: Issue regarding D2D signal transmission/reception at a resource position set as D2D SIG TX RePool or D2D SIG RX RePool when a DeI-UE operates in eIMTA non-fallback mode. Hereinafter, the eIMTA non-fallback mode is defined as "eIMTA NfMode".

Issue #4: Issue regarding efficient reception of a D2D signal transmitted from a D2D UE having communication connection to a DeI-Cell or a D2D UE considering a DeI-Cell as a serving cell.

For convenience of description, the present invention is described based on the 3GPP LTE system. However, the present invention can be extensively applied to other systems as well as the 3GPP LTE system.

Before describing particular embodiments of the present invention, eIMTA FMode and operation therein will be described in detail.

First of all, channel measurement operation in the eIMTA FMode is described. Here, the channel measurement operation means that when a UE succeeds to decode explicit L1 signaling for reconfiguration correctly and detect a valid UL-DL configuration, the UE measures CSI in only subframes indicated as a DL subframe or a special subframe through the explicit L1 signaling for the reconfiguration. When the UE fails to detect L1 signaling carrying a valid UL-DL configuration for a radio frame, the UE may measure CSI in only subframes indicated as a DL subframe or a special subframe through an SIB configuration.

Next, PDCCH or PDSCH reception operation in the eIMTA FMode is described. When a UE succeeds to correctly detect L1 signaling carrying a valid UL-DL configuration for a radio frame, the UE monitors a non-DRX DL subframe or a special subframe indicated through explicit L1 signaling. On the contrary, when a UE fails to detect L1 signaling carrying a valid UL-DL configuration for a radio frame, the UE monitors a non-DRX DL subframe for a PDCCH or EPDCCH or a special subframe indicated by an SIB-1 configuration.

The standards/requirements for determining whether a UL-DL configuration is valid in the eIMTA FMode are described. A DL HARQ reference configuration may be selected from Rel-8 TDD UL-DL configurations {2, 4, 5}. In case of a UE configured with TDD eIMTA (Further Enhancements to LTE Time Division Duplex (TDD) for Downlink-Uplink Interference Management and Traffic Adaptation), the UE complies with a UL-DL configuration signaled through SIB1 to determine an uplink scheduling timing and an HARQ timing. When a UL HARQ reference configuration or DL HARQ reference configuration is valid, the UE considers that a UL subframe or a special subframe of the DL HARQ reference configuration is not used as a DL subframe dynamically or that a DL subframe or a special subframe of the UL HARQ reference configuration is not used as a UL subframe dynamically. In addition, the standards/requirements for determining whether UL and DL HARQ reference configurations are valid may be defined as follows. A set of UL subframes of the DL HARQ reference configuration should be a subset of a set of UL subframes of the UL HARQ reference configuration.

In addition, UL grant validation in the eIMTA FMode is described. Under fallback mode, if a UE receives a UL grant, which corresponds to at least one UL subframe of an SIB1 UL-DL configuration and does not belong to the set of UL subframes of the DL HARQ reference configuration, the UE may determine it as a valid grant. In addition, if a UE receives NACK, which does not belong to the set of UL subframes of the DL HARQ reference configuration, on a PHICH triggering PUSCH transmission in a UL subframe of the SIB1 UL-DL configuration, the UE transmits a PUSCH.

Further, SRS transmission validation in the eIMTA FMode is described. In case of a type-1 SRS, when it is triggered, a subframe in which transmission of the type-1 SRS is scheduled is determined based on the SIB1 UL-DL configuration. In both a type-0 and type-1 SRSs, SRS transmission may be configured in a UL subframe or UpPTS based on the SIB1 UL-DL configuration. If a UE detects L1 signaling carrying a valid UL-DL configuration for radio frame(s) and if the UL subframe or UpPTS for SRS transmission is changed to a DL subframe, the UE may drop the SRS transmission. If a UE does not detect L1 signaling carrying a valid UL-DL configuration for radio frame(s), the UE still transmits the type-1 SRS in UL subframes and special subframes indicated by the SIB1 UL-DL configuration. However, transmission of the type-0 SRS should be dropped in a subframe not indicated as the UL subframe or UpPTS by the DL HARQ reference configuration if there is no PUSCH transmission in the same subframe.

Hereinafter, resource configuration/allocation in D2D communication is described.

In general, when a UE directly communicates with another UE through a radio channel, the UE may select a resource unit (RU) corresponding to a specific resource in a resource pool corresponding to a set of resources and then transmit a D2D signal using the corresponding RU (D2D TX UE's operation). A D2D RX UE receives resource pool information, which can be used by the D2D TX UE for signal transmission, and then detects the signal from the D2D TX UE in the corresponding resource pool. In this case, the resource pool information may i) be indicated by a base station when the D2D TX UE is in coverage of the base station or ii) be indicated by another UE or determined as pre-configured resources when the D2D TX UE is out of the coverage of the base station.

In general, a resource pool includes a plurality of RUs. In addition, each UE may select one or more RUs to transmit its D2D signal.

Figure 10:
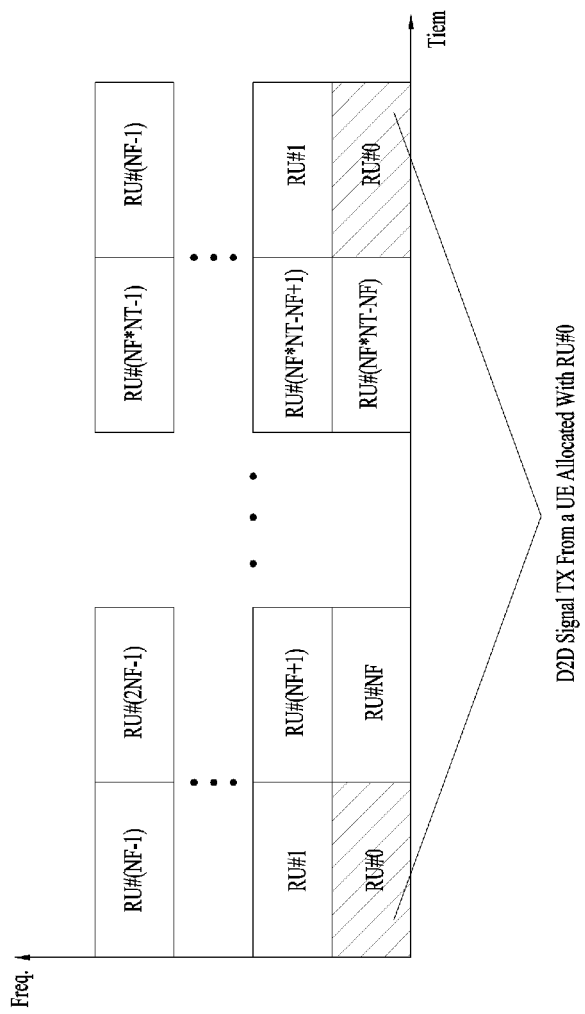
FIG. 10 illustrates a resource unit configuration for D2D communication according to the present invention.

FIG. 10 is a reference diagram for explaining an example of a resource unit (RU) configuration for D2D communication. All frequency resources are divided into NF resource units and all time resources are divided into NT resource units, thereby defining total (NF*NT) resource units. In this case, the resource pool is repeated with a period of NT subframes. As shown in FIG. 10, one specific resource unit may be repeated periodically. Alternatively, to obtain a diversity effect in a time dimension or a frequency dimension, an index of a physical RU to which a single logical RU is mapped may be changed according to a time based on a predetermined pattern. Considering such a resource unit structure, the resource pool may mean a set of resource units that can be used by a UE intending to transmit a D2D signal to transmit the D2D signal.

The aforementioned resource pool can be subdivided into several types. In particular, the resource pool may be classified according to a content of the D2D signal transmitted in each resource pool. For example, the content of the D2D signal can be classified as follows and a separate resource pool may be configured for each content.

Scheduling assignment (SA): The SA means a signal containing information such as a location of resources used by each D2D TX UE for transmitting a following D2D data channel, MCS (modulation and coding scheme) necessary for demodulation of other data channels, or a MIMO transmission scheme. In addition, this signal may be multiplexed and transmitted with D2D data on the same resource unit. In this case, an SA resource pool may mean a resource pool in which the SA is multiplexed and transmitted with the D2D data.

D2D data channel: The D2D data channel may mean a resource pool used by the D2D TX UE for transmitting user data by utilizing the resources designated through the SA. In case the D2D data channel is multiplexed and transmitted with SA information on the same resource unit, only the D2D data channel except the SA information may be transmitted in the resource pool for the D2D data channel. In other words, resource elements (REs) used for transmitting the SA information on each resource unit in the SA resource pool may be used for transmitting the D2D data on the D2D data channel resource pool.

Discovery message: A discovery message resource pool may mean a resource pool for transmitting the discovery message. The D2D TX UE may transmit the discovery message containing information such as its ID for the purpose of enabling neighboring UEs to discover the corresponding D2D TX UE.

As described above, the D2D resource pool may be classified according to the content of the D2D signal. However, although D2D signals have the same content, different resource pools may be used according to transmitting/receiving properties of the D2D signals. For instance, even in the case of the same D2D data channel or discovery message, different resource pools may be used according to i) a scheme for determining a transmission timing of a D2D signal (e.g., a scheme for transmitting a D2D signal at a reception time of a synchronization reference signal or a scheme for transmitting a D2D signal at a time obtained by applying a timing advance to a reception time of a synchronization reference signal), ii) a scheme for allocating a resource (e.g., a scheme in which an eNB designates a resource for transmitting each signal for each D2D TX UE or a scheme in which each D2D TX UE autonomously selects a resource for transmitting each signal from its pool), or iii) a signal format (e.g., the number of symbols occupied by each D2D signal in a single subframe or the number of subframes used for transmitting a single D2D signal).

In addition, a resource allocation method for D2D data channel transmission can be divided into the following two modes.

Mode 1: In mode 1, an eNB directly designates a resource for transmitting SA and D2D data for each D2D TX UE. As a result, the eNB can accurately grasp which UE uses which resource for D2D signal transmission. However, if the eNB designates a D2D resource for every D2D signal, it may cause significant signaling overhead. Hence, the eNB may allocate a plurality of SA transmission resources and/or data transmission resources through one-time signaling.

Mode 2: In mode 2, each D2D TX UE selects an appropriate resource from a series of resource pools associated with SA and data, which are configured by an eNB for a plurality of D2D TX UEs, and then transmits SA and data. As a result, the eNB cannot accurately grasp which UE uses which resource for D2D signal transmission.

Furthermore, a resource allocation method for discovery message transmission can be divided into two types.

TYPE 1: TYPE 1 corresponds to a discovery procedure where resources for discovery signal transmission are allocated on a non-UE-specific basis. In this case, the resources may be for all UEs or a group of UEs TYPE 2: TYPE 2 corresponds to a discovery procedure where resources for discovery signal transmission are allocated on a UE-specific basis.

TYPE 2A: Resources are allocated for each specific transmission instance of discovery signals.

TYPE 2B: Resources are semi-persistently allocated for discovery signal transmission.

Figure 11:
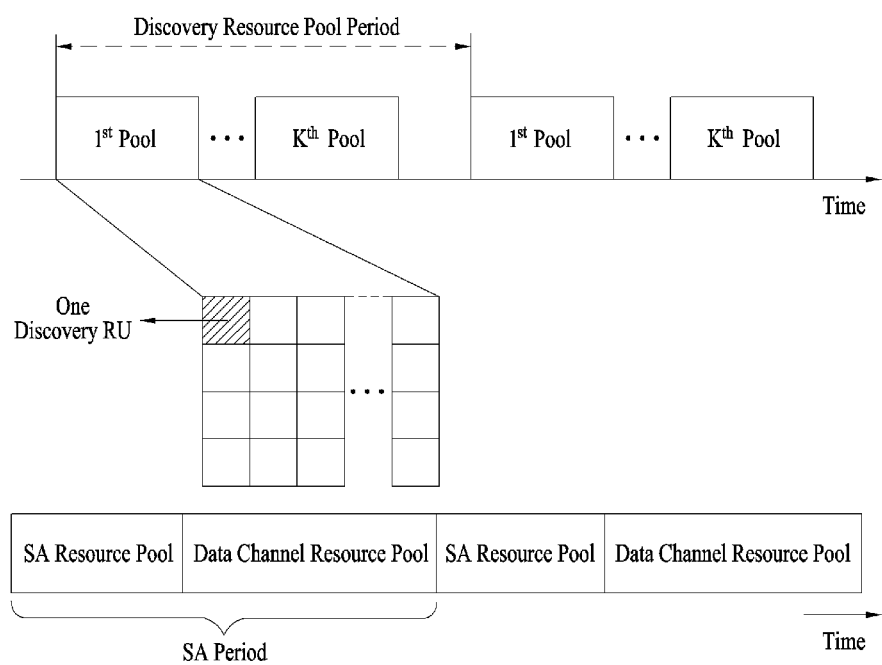
FIG. 11 illustrates a case in which a resource pool associated with a discovery message periodically appears.

FIG. 11 illustrates a case in which a resource pool associated with a discovery message (hereinafter referred to as 'discovery resource pool') periodically appears. In FIG. 11, a period at which the corresponding resource pool appears is named 'discovery resource pool period'. Moreover, in FIG. 11, among multiple discovery resource pools configured in (one) discovery resource pool period, specific discovery resource pool(s) may be defined as discovery transmission/reception resource pool(s) associated with a serving cell and other (remaining) discovery resource pool (s) may be defined as discovery reception resource pool(s) associated with a neighbor cell.

As embodiments of the present invention, methods #1 to #12, which will be described in the following, can be applied/configured to/for a D2D SIG TX RePool or D2D SIG RX RePool of a DeI-UE. In this case, when a D2D UE is in coverage of a cell, information on the D2D SIG TX RePool or D2D SIG RX RePool may be informed by the cell through a predetermined signal. On the contrary, when the D2D UE is out of the coverage of the cell, the information may be informed by another D2D UE or pre-configured resources may be used. Further, the embodiments of the present invention can be extensively applied in order to configure not only a D2D SIG TX RePool or D2D SIG RX RePool of a DeI-UE but also a D2D SIG TX RePool or D2D SIG RX RePool of a D2D UE (i.e., a UE operates in non-eIMTA).

Method #1

According to the method #1, it may be configured that in a DeI-cell, only the subframes, which are persistently/semi-persistently/fixedly used for UL usage, can be designated as a D2D SIG TX RePool or D2D SIG RX RePool. For instance, i) UL SFs of a DL HARQ reference configuration (signaled through RRC signaling related to eIMTA operation), or ii) UL SFs of which usage is not persistently/semi-persistently/fixedly changed among UL SFs in an SIB1 (or RadioResourceConfigCommonSCell IE) UL-DL configuration may be defined as the persistent/semi-persistent/fixed usage of UL subframes (SFs). In addition, it may be configured that the DeI-cell transmit, to a DeI-UE, information on the latter (i.e., the UL SFs of ii) through a pre-configured signal (e.g., higher layer signal or physical layer signal).

Method #2

According to the method #2, it may be configured that in the DeI-cell, not only the persistent/semi-persistent/fixed usage of the UL SFs but also UL SFs of which usage is variable can be designated as the D2D SIG TX RePool or D2D SIG RX RePool. Here, the UL SFs in the SIB1 (or RadioResourceConfigCommonSCell IE) UL-DL configuration except the UL SFs of the DL HARQ reference configuration (signaled through the RRC signaling related to eIMTA operation) may be defined as the UL SFs of which the usage is variable.

For instance, when a D2D SIG TX RePool or D2D SIG RX RePool having the same amount of resources are configured, according to the method #2, it is possible to configure the D2D SIG TX RePool or D2D SIG RX RePool in a relatively short time resource domain rather than the method #1. That is, according to the method #2, it is possible to secure more UL SFs that can be designated as the D2D SIG TX RePool or D2D SIG RX RePool in the same time interval rather than the method #1.

As another example, according to the method #2 by which the D2D SIG TX RePool or D2D SIG RX RePool having the same amount of resources can be configured in the relatively short time resource domain, a time required for completion of a blind search for the D2D SIG RX RePool can be reduced compared to the method #1. Thus, D2D UE's power consumption associated with the D2D SIG RX RePool search (i.e., a D2D UE performing the search for the D2D SIG RX RePool in IDLE mode) can also be reduced.

In addition, according to the present invention, DeI-UEs' D2D signal transmission/reception operation in the eIMTA FMode or eIMTA NfMode may be defined as methods #3 to #8.

Method #3

According to the method #3 of the present invention, in the eIMTA FMode, it may be configured that the DeI-UE is allowed to perform D2D signal transmission/reception operation in the D2D SIG TX RePool or D2D SIG RX RePool without distinguishing between the persistent/semi-persistent/fixed usage of the UL SFs and the UL SFs of which the usage is variable.

In this case, the method #3 can be configured such that it is limitedly applied only to a situation that the method #1 is applied. In other words, since only the SFs that are persistently/semi-persistently/fixedly used for UL usage can be designated as the D2D SIG TX RePool or D2D SIG RX RePool used in the method #1, D2D signal transmission/reception operation in the corresponding D2D SIG TX RePool or D2D SIG RX RePool can be guaranteed (from the perspective of the DeI-UE) even in the eIMTA FMode.

As another example, the method #3 may be applied together with the method #2. In this case, such a method may mean that i) the variable usage of the UL SFs, which are designated as the D2D SIG TX RePool or the D2D SIG RX RePool or ii) at least SFs in which the D2D signal transmission/reception is actually configured or performed among the variable usage of the UL SFs designated as the D2D SIG TX RePool or the D2D SIG RX RePool are guaranteed/managed by the DeI-Cell as the persistent/semi-persistent/fixed UL SFs.

Method #4

According to the method #4 of the present invention, in the eIMTA FMode, it may be configured that the DeI-UE is allowed to perform the D2D signal transmission/reception operation only in the persistent/semi-persistent/fixed usage of the UL SFs in the D2D SIG TX RePool or D2D SIG RX RePool.

In other words, even though the UL SF of which the usage is variable are designated as the D2D SIG TX RePool or D2D SIG RX RePool, the DeI-UE does not use the corresponding UL SFs for D2D signal transmission/reception under the eIMTA FMode. In this case, the method #4 can be configured such that it is limitedly applied only to a situation that the method #2 is applied.

Additionally, in the eIMTA FMode, it may be configured that the DeI-UE is allowed to perform the D2D signal transmission/reception operation in not only the persistent/semi-persistent/fixed usage of the UL SFs in the D2D SIG TX RePool or D2D SIG RX RePool but also variable usage of UL SFs in which aperiodic SRS (A-SRS) transmission is performed. In this case, the above-mentioned D2D signal transmission/reception operation may be limitedly applied only i) when a Mode 1 D2D data channel (to which a WAN UL-related TA value is applied) or a Mode 2 D2D data channel is transmitted and/or ii) when D2D signal transmission (e.g., Mode 1 data channel transmission) and A-SRS transmission is simultaneously performed.

Method #5

According to the method #5 of the present invention, in the eIMTA NfMode, it may be configured that the DeI-UE is allowed to perform the D2D signal transmission/reception operation only in SFs actually used for UL usage by a reconfiguration message in the D2D SIG TX RePool or D2D SIG RX RePool.

In other words, even though a specific UL SF of which usage is variable is designated as the D2D SIG TX RePool or D2D SIG RX RePool, the DeI-UE does not perform the D2D signal transmission/reception operation in the SF if the corresponding SF is changed to a DL SF by the reconfiguration message. Moreover, such a method may be interpreted as that WAN communication (or eIMTA operation) has a priority over D2D communication. In this case, the method #5 can be configured such that it is limitedly applied only to the situation that the method #2 is applied.

Further, when frequency hopping operation of a D2D signal (e.g., discovery message transmission, D2D data channel transmission, SA transmission, etc.) is applied together with the method #5, final frequency hopping operation can be executed in the D2D SIG TX RePool or D2D SIG RX RePool i) after subframe index mapping associated with the frequency hopping operation is (re)performed on the assumption that there is no UL SF used for DL usage or ii) after the subframe index mapping associated with the frequency hopping operation is (re)performed only in the remaining SFs except UL SFs changed for DL usage.

Method #6

According to the method #6 of the present invention, in the eIMTA NfMode, it may be configured that the DeI-UE is allowed to perform the D2D signal transmission/reception operation in the D2D SIG TX RePool or D2D SIG RX RePool. This may mean that i) the variable usage of the UL SFs, which are designated as the D2D SIG TX RePool or the D2D SIG RX RePool or ii) at least the SFs in which the D2D signal transmission/reception is actually configured (or performed) among the variable usage of the UL SFs designated as the D2D SIG TX RePool or the D2D SIG RX RePool are guaranteed/managed by the DeI-Cell as the persistent/semi-persistent/fixed UL SFs. Further, such a method may be interpreted as that D2D communication has a priority over WAN communication (or eIMTA operation).

Method #7

According to the method #7 of the present invention, whether at least one (i.e., some or all) of the aforementioned embodiments (e.g., methods #1 to #6) of the present invention is applied can be determined according to i) a content type of a D2D signal (e.g., SA (scheduling assignment), D2D data channel, discovery message) and/or ii) a scheme for determining a transmission timing of a D2D signal when D2D signals has the same content (e.g., a scheme for transmitting a D2D signal at a reception time of a synchronization reference signal or a scheme for transmitting a D2D signal at a time obtained by applying a timing advance to a reception time of a synchronization reference signal), and/or iii) a scheme for allocating a resource (e.g., a scheme in which an cell designates a resource for transmitting each signal for each D2D TX UE or a scheme in which each D2D TX UE autonomously selects a resource for transmitting each signal from its pool), or iv) a signal format (e.g., the number of symbols occupied by each D2D signal in a single subframe or the number of subframes used for transmitting a single D2D signal). Hereinafter, the method #7 is described based on configurations #7-1 to #7-3.

Configuration #7-1:

As an example of the method #7, TYPE 2B discovery message transmission, which is defined by semi-persistent resource allocation, may be defined as similar to periodic SRS (P-SRS) transmission in the conventional eIMTA operation. This is because both of the TYPE 2B discovery message transmission and the P-SRS transmission is performed based on the semi-persistent resource allocation and in the case of the eIMTA operation, only a P-SRS among signals defined based on the semi-persistent resource allocation can be configured with a resource associated with a UL SF of which usage is variable.

In detail, in the case of the TYPE 2B discovery message transmission, it can be defined that not only the persistent/semi-persistent/fixed usage of the UL SFs but also the variable usage of the UL SFs may be designated as a resource pool related the TYPE 2B discovery message transmission (hereinafter referred to as 'D2D 2B DS TX RePool') or a resource pool associated with TYPE 2B discovery message reception (hereinafter referred to as 'D2D 2B DS RX RePool') (for example, the method #2).

In addition, in the case of the TYPE 2B discovery message transmission, under the eIMTA NfMode, it can be defined that the D2D signal transmission/reception operation is allowed only in the SFs actually used for UL usage by the reconfiguration message in a D2D 2B DS TX RePool or D2D 2B DS RX RePool, which is previously configured or signaled (for example, the method #5). On the other hand, under the eIMTA FMode, it can be defined that the D2D signal transmission/reception operation is allowed only in the persistent/semi-persistent/fixed usage of the UL SFs in the previously configured or signaled D2D 2B DS TX RePool or D2D 2B DS RX RePool (e.g., the method #4). In this case, if not only the persistent/semi-persistent/fixed usage of the UL SFs but also the variable usage of the UL SFs are designated as the D2D 2B DS TX RePool or D2D 2B DS RX RePool, such a method can solve a problem, which is caused by disagreement of understanding/interpretation/application of usage of the UL SFs of which the usage is variable between the DeI-Cell and the DeI-UE under the eIMTA FMode.

Moreover, in the case of the TYPE 2B discovery message transmission, under the eIMTA FMode (and/or eIMTA NfMode), it can be defined that the D2D signal transmission/reception operation is allowed in the D2D 2B DS TX RePool or D2D 2B DS RX RePool irrespective of the persistent/semi-persistent/fixed usage of the UL SFs and the variable usage of the UL SFs. In this case, such a scheme may mean that i) the variable usage of the UL SFs, which are designated as the D2D 2B DS TX RePool or D2D 2B DS RX RePool or ii) at least the SFs in which the D2D signal transmission/reception is actually configured (or performed) among the variable usage of the UL SFs designated as the D2D 2B DS TX RePool or D2D 2B DS RX RePool are guaranteed/managed by the DeI-Cell as the persistent/semi-persistent/fixed UL SFs.

Configuration #7-2:

As another example of the method #7, in TYPE 1 discovery message transmission or Mode 2 D2D data channel transmission, a D2D 1 DS TX RePool (D2D Type 1 Discovery transmission resource pool) or a D2D M2 CM TX RePool (D2D Mode 2 Communication transmission resource pool) can be configured. In addition, it can be defined that the D2D signal transmission operation in the eIMTA FMode and the eIMTA NfMode is allowed according the method #3 (in the case of the eIMTA FMode) and the method #6 (in the case of the eIMTA NfMode), respectively.

In the TYPE 1 discovery message transmission or Mode 2 D2D data channel transmission, since a cell configures the D2D 1 DS TX RePool or D2D M2 CM TX RePool for a plurality of D2D TX UEs and each of the D2D TX UEs transmits a D2D signal by selecting an appropriate resource from the configured D2D 1 DS TX RePool/D2D M2 CM TX RePool, the cell cannot exactly know which D2D TX UE uses which resource for D2D transmission.

Thus, to guarantee/manage stable D2D communication, i) UL SFs selected as the D2D 1 DS TX RePool or D2D M2 CM TX RePool are guaranteed by the cell as the persistent/semi-persistent/fixed UL SFs or ii) only the persistent/semi-persistent/fixed UL SF can be designated as the D2D 1 DS TX RePool or D2D M2 CM TX RePool.

Configuration #7-3:

As a further example of the method #7, in Mode 1 D2D data channel transmission or TYPE 2A discovery message channel transmission, aperiodic SRS (A-SRS) transmission operation under the conventional eIMTA operation may be defined as similar to PUSCH transmission operation.

In the Mode 1 D2D data channel transmission or TYPE 2A discovery message channel transmission, since a cell directly designates a resource for transmitting a D2D signal for each D2D TX UE, the cell can exactly know which D2 TX UE uses which time/frequency resource for D2D signal transmission. In detail, in the Mode 1 D2D data channel transmission or TYPE 2A discovery message channel transmission, it can be defined that not only the persistent/semi-persistent/fixed usage of the UL SFs but also the variable usage of the UL SFs may be designated as a D2D M1 CM TX RePool (D2D Mode 1 Communication transmission resource pool) or a D2D 2A DS TX RePool (D2D Type 2A Discovery transmission resource pool) (e.g., the method #2). Further, in the Mode 1 D2D data channel transmission or TYPE 2A discovery message channel transmission, under the eIMTA NfMode, it can be defined that only when a specific time/frequency resource in a previously configured or signaled D2D M1 CM TX RePool or D2D 2A DS TX RePool is designated for specific D2D TX UE's Mode 1 D2D data channel transmission or TYPE 2A discovery message channel transmission and the specific time/frequency resource is actually used for UL usage by the reconfiguration message, the D2D signal transmission operation is allowed (e.g., the method #5).

On the other hand, under the eIMTA FMode, it can be defined that when the specific time/frequency resource in the previously configured or signaled D2D M1 CM TX RePool or D2D 2A DS TX RePool is designated for the specific D2D TX UE's Mode 1 D2D data channel transmission or TYPE 2A discovery message channel transmission, the D2D signal transmission operation is allowed without differentiation between the persistent/semi-persistent/fixed usage of the UL SFs and the variable usage of the UL SFs (e.g., the method #3).

Further, in the case of Mode 1 D2D data channel transmission or TYPE 2A discovery message channel transmission, when the specific time/frequency resource in the D2D M1 CM TX RePool or D2D 2A DS TX RePool is designated for the specific D2D TX UE's Mode 1 D2D data channel transmission or TYPE 2A discovery message channel transmission, such operation can be interpreted/determined as that at least the specific time/frequency resource is guaranteed by the cell as a UL SF (i.e., reserved for the D2D signal transmission) since the cell directly designate a time/frequency resource to be used in the Mode 1 D2D data channel transmission or TYPE 2A discovery message channel transmission for each D2D TX UE.

As a further embodiment of the present invention, a method for allowing D2D UE#Y to efficiently search for/detect a D2D signal transmitted by D2D UE#X, which has communication connectivity with a DeI-Cell or considers the DeI-cell as a serving cell, may be defined as the following methods #8 and #9. Here, the D2D UE#X that has the communication connectivity with the DeI-Cell or considers the DeI-cell as the serving cell may be a DeI-UE and/or a D2D UE (i.e., a UE operating in the non-eIMTA). In addition, the D2D UE#Y may be i) a D2D UE that intends to searches for/detect the D2D signal from the D2D UE#X in IDLE mode (hereinafter defined as "CASE#A") and/or ii) a D2D UE (or DeI-UE) that intends to searches for/detect the D2D signal from the D2D UE#X while having communication connectivity with a different cell except the DeI-Cell (or different DeI-Cell) or considering the different cell except the DeI-Cell (or different DeI-Cell) as a serving cell (hereinafter defined as "CASE#B").

By applying the methods #8 and #9 proposed in the present, power consumption associated with search/detection for/of the D2D signal from the D2D UE#X can be reduced in an adaptive manner.

In addition, information transmitted to the D2D UE#Y in the following methods #8 and #9 may i) be defined in advance, ii) be signaled from a serving cell or another D2D UE in advance, iii) be informed such that a serving cell (re)signals information received from a neighbor cell through a pre-configured channel (e.g., X2 interface), or iv) be implicitly known through a pre-configured rule/configuration/function.

Method #8

According to the method #8 of the present invention, at least part (i.e., some or all) of information on the following configurations #8-1 to #8-5 is informed the D2D UE#Y. Thus, the D2D UE#Y can be allowed to perform search/detection for/of the D2D signal from the D2D UE#X on time/frequency resources, on which the D2D UE#X actually performs (or is highly likely to perform) D2D signal transmission, contained in a D2D SIG RX RePool associated with the search/detection for/of the D2D signal from the D2D UE#X. Further, the configurations of the method #8 may be limitedly applied to the CASE#B.

Configuration #8-1:

Information on an actual UL-DL configuration (or intended UL-DL configuration) of the DeI-Cell, which has the communication connectivity with the D2D UE#X or is considered as the serving cell by the D2D UE#X, can be transmitted. Here, the actual UL-DL configuration (or intended UL-DL configuration may mean an UL-DL configuration applied (or updated) during a reconfiguration period by the DeI-Cell, which has the communication connectivity with the D2D UE#X or is considered as the serving cell by the D2D UE#X.

For instance, if the D2D UE#Y is informed of information in accordance with the configuration #8-1, the D2D UE#Y may be configured not to perform search/detection operation on variable usage of UL SFs, which has been reconfigured for DL usage, in the D2D SIG RX RePool associated with the discovery/detection for/of the D2D signal from the D2D UE#X. Additionally, not only the information on the actual UL-DL configuration (or intended UL-DL configuration) of the DeI-Cell but also information on the reconfiguration period configured or assumed by the corresponding DeI-Cell may be informed together.

Configuration #8-2:

Information on resources persistently/semi-persistently/fixedly used for UL usage by the DeI-Cell that has the communication connectivity with the D2D UE#X or is considered as the serving cell by the D2D UE#X can be transmitted. In this case, information on persistent/semi-persistent/fixed usage of UL SFs may be informed the D2D UE#Y in the form of i) information on a DL HARQ reference configuration (associated with the eIMTA operation) of the corresponding DeI-Cell or ii) information on UL SFs of which usage is not changed persistently/semi-persistently/fixedly among UL SFs in an SIB1 (or RadioResourceConfigCommonSCell IE) UL-DL configuration of the corresponding DeI-Cell (e.g., bitmap) or information on UL SFs of which usage is variable.

For instance, if the D2D UE#Y is informed of information in accordance with the configuration #8-2, the D2D UE#Y may be configured to perform the search/detection operation only on the persistent/semi-persistent/fixed usage of the UL SFs in the D2D SIG RX RePool associated with the discovery/detection for/of the D2D signal from the D2D UE#X.

As another example, if the DL HARQ reference configuration (associated with the eIMTA operation) is shared (or commonly configured) between the DeI-cell that has the communication connectivity with the D2D UE#X or is considered as the serving cell by the D2D UE#X and the different DeI-Cell that is the communication connectivity with the D2D UE#Y or is considered as the serving cell by the D2D UE#Y, relevant information may not need to be informed the D2D UE#Y (e.g., DeI-UE#Y) additionally.

Additionally, the serving cell of the D2D UE#Y may grasp/estimate resources persistently/semi-persistently/fixedly used for UL usage by a neighbor cell, which performs the eIMTA operation, based on actual UL-DL configuration (or intended UL-DL configuration) information and/or SF Set-Dependent OI (Subframe Set-Dependent Overload Information/Indication) received from the corresponding neighbor cell (here, "OI" indicates information configured by a specific victim cell to inform neighbor cell(s) of its own interference level per p pre-configured or signaled resource unit (e.g., PRB) through an X2 interface and it can be interpreted as a complain signal). For instance, the serving cell of the D2D UE#Y may i) consider UL SFs not changed to DL SFs according to the actual UL-DL configuration (or intended UL-DL configuration) information, which is received during a prescribed time interval from the neighbor cell performing the eIMTA operation, as the persistent/semi-persistent/fixed UL SFs or ii) consider UL SFs indicated to have a relatively small amount of interference through the SF Set-Dependent OI, which is received during a prescribed time interval from the neighbor cell performing the eIMTA operation, as the persistent/semi-persistent/fixed UL SFs.

Configuration #8-3:

Information on whether the DeI-Cell that has the communication connectivity with the D2D UE#X or is considered as the serving cell by the D2D UE#X performs the eIMTA operation can be transmitted.

For instance, if the D2D UE#Y is informed of information in accordance with the configuration #8-3, the D2D UE#Y may at least determine which UL SFs can be (or is highly likely to be) used for the D2D signal transmission from the D2D UE#X in the D2D SIG RX RePool associated with the discovery/detection for/of the D2D signal from the D2D UE#X. Specifically, if the DeI-Cell does not perform the eIMTA operation, the D2D UE#Y may determine that all UL SFs in the D2D SIG RX RePool associated with the discovery/detection for/of the D2D signal from the D2D UE#X can be (or is highly likely to be) used for the D2D signal transmission from the D2D UE#X. On the other hand, if the DeI-cell performs the eIMTA operation, the D2D UE#Y may determine that at least SF #2 (i.e., an SF always used for UL usage in all UL-DL configurations can be (or is highly likely to be) used for the D2D signal transmission from the D2D UE#X. In this case, if the D2D UE#Y obtains a physical identifier of the DeI-Cell performing the eIMTA operation through the aforementioned methods, the D2D UE#Y may grasp/estimate which SFs among the remaining SFs are actually used as DL SFs by performing blind detection for a previously defined or signaled reference signal (e.g., CRS, CSI-RS, etc.) on the remaining UL SFs except the SF #2.

In addition, the serving cell of the D2D UE#Y may determine/estimate whether the neighbor cell performs the eIMTA operation based on the actual UL-DL configuration (or intended UL-DL configuration) information and/or SF Set-Dependent OI received from the corresponding neighbor cell. For instance, when receiving the actual UL-DL configuration (or intended UL-DL configuration) information and/or SF Set-Dependent OI from the neighbor cell, the serving cell of the D2D UE#Y may determine/estimate that the neighbor cell performs the eIMTA operation.

Configuration #8-4:

Information on which resource (e.g., SF) cannot be (or is unlikely to) used for the D2D signal transmission from the D2D UE#X in the D2D SIG RX RePool associated with the discovery/detection for/of the D2D signal from the D2D UE#X can be transmitted.

Configuration #8-5:

Information on an SIB1 (or RadioResourceConfigCommonSCell IE) UL-DL configuration of a cell (or DeI-cell) that has the communication connectivity with the D2D UE#X or is considered as the serving cell by the D2D UE#X can be transmitted. In this case, information in accordance with the configuration #8-5 may be informed the D2D UE#Y together with at least part (i.e., some or all) of the information described in the aforementioned configurations #8-1 to #8-4.

In addition, when an SIB1 (or RadioResourceConfigCommonSCell IE) UL-DL configuration information of a cell (or DeI-cell) that has the communication connectivity with the D2D UE#Y or is considered as the serving cell by the D2D UE#Y is different from the SIB1 (or RadioResourceConfigCommonSCell IE) UL-DL configuration information of the cell (or DeI-cell) that has the communication connectivity with the D2D UE#X or is considered as the serving cell by the D2D UE#X, the information in accordance with the configuration #8-5 can be efficiently used by the D2D UE#Y in order to grasp i) which locations of UL SFs are considered for the D2D SIG RX RePool associated with the discovery/detection for/of the D2D signal from the D2D UE#X or ii) which SIB1 (or RadioResourceConfigCommonSCell IE) UL-DL configuration is used for the D2D SIG RX RePool associated with the discovery/detection for/of the D2D signal from the D2D UE#X.

Method #9

According to the method #9 of the present invention, the D2D UE#Y may be configured to search for/detect the D2D signal from the D2D UE#X in the D2D SIG RX RePool associated with the discovery/detection for/of the D2D signal from the D2D UE#X according to at least one (i.e., some or all) of the following configurations #9-1 and #9-2. Further, the method #9 can be limitedly applied to the CASE#A.

Configuration #9-1:

If the D2D UE#Y fails to detect the D2D signal from the D2D UE#X or any D2D signals from other D2D UEs in a D2D SIG RX RePool associated with discovery/monitoring of the D2D signal from the D2D UE#X during a previously defined or signaled time interval (e.g., "Search Window" hereinafter defined as "SeWin"), the D2D UE#Y may stop/exclude search/monitoring for/of the D2D signal from the D2D UE#X in the corresponding D2D SIG RX RePool during a previously defined or signaled time interval (e.g., "Stop Window" hereinafter defined as "StWin" by assuming i) that there is no D2D signal transmission from the D2D UE#X or ii) that there is no D2D UE#X that the D2D UE#Y desires to discover.

In this case, if the D2D signal from the D2D UE#X is not detected during N consecutive SeWins, a size of the StWin may be increased by N times. Specifically, if the D2D signal from the D2D UE#X is not detected during one SeWin, the size of the StWin may not be changed. If the D2D signal from the D2D UE#X is not detected during two consecutive SeWins, the size of the StWin may be doubled, i.e., set to 2*StWin.

In addition, If the D2D UE#Y fails to detect the D2D signal from the D2D UE#X or any D2D signals from other D2D UEs from some resources (e.g., SFs) in the D2D SIG RX RePool associated with the discovery/monitoring of the D2D signal from the D2D UE#X during the previously defined or signaled SeWin, the D2D UE#Y may stop/exclude the search/monitoring for/of the D2D signal from the D2D UE#X in the corresponding D2D SIG RX RePool during the previously defined or signaled StWin on the assumption i) that there is no D2D signal transmission from the D2D UE#X or ii) that there is no D2D UE#X that the D2D UE#Y desires to discover. In this case, if the D2D signal from the D2D UE#X is not detected during the N consecutive SeWins, the size of the StWin may be increased by N times.

Configuration #9-2:

The D2D UE#Y can be informed i) which target UE is associated with each or some of resources in the D2D SIG RX RePool or ii) which target service is associated with each or some of resources in the D2D SIG RX RePool. If each or some of the resources in the D2D SIG RX RePool is not associated with the D2D UE#X (or service) that the D2D UE#Y desired to discover (or search for/detect), the D2D UE#Y may stop/exclude the search/monitoring for/of the D2D signal from the D2D UE#X in each or some of the resources in the corresponding D2D SIG RX RePool.

Further, the D2D UE#X may interpret/apply a bitmap associated with a D2D SIG RePool (D2D signal resource pool) through methods #10 to #12 proposed in the present invention. Here, the D2D SIG RePool may refer to as a D2D SIG TX RePool and/or D2D SIG RX RePool. In addition, when the D2D UE#X is in coverage of the serving cell, information on the bitmap associated with the D2D SIG RePool may be informed by the serving cell through a pre-configured signal. On the contrary, when the D2D UE#X is out of the coverage of the serving cell, the information may be informed by another D2D UE or determined as predetermined information (e.g., bitmap value). Further, for convenience of description, the serving cell of the D2D UE#X may be named "SrCell#X" and a neighbor cell corresponding to a target cell where the D2D UE#X performs D2D signal search/reception operation is named "NgCell#Y"

Method #10

According to the method #10 of the present invention, it can be defined that the D2D UE#X performs interpretation of a SrCell#X-related D2D SIG RePool bitmap (i.e., N bits) according to configurations #10-1 to #10-3.

Configuration #10-1:

It may be configured that in the SrCell#X-related D2D SIG RePool bitmap (i.e., N bits), bits indicating resources (e.g., SFs) used for D2D communication (e.g., bits set to "1") are sequentially applied in consideration of only UL SFs. For instance, if the SrCell#X-related D2D SIG RePool bitmap is set to "10100", it may mean that first and third UL SFs in a UL-DL configuration information, which is designated according to a pre-configured rule or signaled in advance, are used for the D2D communication.

Configuration #10-2:

It may be configured that in the SrCell#X-related D2D SIG RePool bitmap (i.e., N bits), the bits indicating the resources (e.g., SFs) used for the D2D communication (e.g., bits set to "1") are sequentially applied to SFs without limitation of UL SFs. For instance, if the SrCell#X-related D2D SIG RePool bitmap is set to "10100", it may mean that the first and third UL SFs in the UL-DL configuration information, which is designated according to the pre-configured rule or signaled in advance, are used for the D2D communication. Such a method may be interpreted as that the D2D communication is performed irrespective of usage of SFs in the UL-DL configuration information designated according to the pre-configured rule or signaled in advance.

In addition, if at least some (i.e., some or all) of D2D SFs indicated by the SrCell#X-related D2D SIG RePool bitmap are defined as DL SFs in the UL-DL configuration information designated according to the pre-configured rule or signaled in advance, the D2D UE#X may not perform D2D communication operation by assuming that the SrCell#X-related D2D SIG RePool bitmap is not valid or not received correctly. Alternatively, the D2D UE#X may limitedly perform the D2D communication operation only on UL SFs in the UL-DL configuration information designated according to the pre-configured rule or signaled in advance among the D2D SFs indicated by the SrCell#X-related D2D SIG RePool bitmap.

Configuration #10-3:

In the above-mentioned configuration #10-1 or #10-2, SrCell#X-related UL-DL configuration information, which is assumed by the D2D UE#X to apply the SrCell#X-related D2D SIG RePool bitmap, can be determined as follows.

For example, it may be assumed to be SIB1 (or RadioResourceConfigCommonSCell IE) UL-DL configuration information of the SrCell#X. In this case, the above assumption may be limitedly applied only when the SrCell#X does not perform the eIMTA operation.

As another example, it may be assumed to be actual UL-DL configuration information associated with the eIMTA operation (or DL HARQ reference configuration information associated with the eIMTA operation) of the SrCell#X. Here, the actual UL-DL configuration information means UL-DL configuration information updated through a reconfiguration message. In addition, the above assumption may be limitedly applied only when the SrCell#X performs the eIMTA operation.

Method #11

According to the method #11 of the present invention, NgCell#Y-related UL-DL configuration information, which is assumed by the D2D UE#X to apply an NgCell#Y-related D2D SIG RePool bitmap, can be determined according to configurations #11-1 to #11-5.

Configuration #11-1:

The NgCell#Y-related UL-DL configuration information may be assumed to be identical to the SIB1 (or RadioResourceConfigCommonSCell IE) UL-DL configuration information of the SrCell#X. In this case, the assumption may be limitedly applied only when the SrCell#X (and/or the NgCell#Y) does not perform the eIMTA operation.

Configuration #11-2:

The NgCell#Y-related UL-DL configuration information may be assumed to be identical to the actual UL-DL configuration information (associated with the eIMTA operation) (or DL HARQ reference configuration information (associated with the eIMTA operation)) of the SrCell#X. In this case, the assumption may be limitedly applied only when the SrCell#X (and/or the NgCell#Y) performs the eIMTA operation.

Configuration #11-3:

If the D2D UE#X grasps NgCell#Y-related SIB1 (or RadioResourceConfigCommonSCell IE) UL-DL configuration information, the NgCell#Y-related UL-DL configuration information may be assumed to be identical to SIB1 (or RadioResourceConfigCommonSCell IE) UL-DL configuration information of the NgCell#Y. In this case, the NgCell#Y-related SIB1 (or RadioResourceConfigCommonSCell IE) UL-DL configuration information can be grasped through conventional NeighCellConfig signaling (e.g., a case in which the corresponding signaling is designated as a state indicating "Same UL/DL Allocation In Neighboring-Cells") or corresponding information signaling from the SrCell#X (or a relay UE that retransmits the corresponding information) (e.g., the configuration #8-1 of the method #8). Further, the configuration #11-3 may be limitedly applied on when the NgCell#Y (and/or SrCell#X) does not perform the eIMTA operation.

Configuration #11-4:

If the D2D UE#X grasps i) NgCell#Y-related actual UL-DL configuration information (associated with the eIMTA operation), ii) NgCell#Y-related intended UL-DL configuration information (associated with the eIMTA operation), and iii) NgCell#Y-related DL HARQ reference configuration information (associated with the eIMTA operation), the D2D UE#X may assume that i) the NgCell#Y-related actual UL-DL configuration information, ii) the NgCell#Y-related intended UL-DL configuration information, and iii) the NgCell#Y-related DL HARQ reference configuration information correspond to i) actual UL-DL configuration information, ii) intended UL-DL configuration information, and iii) DL HARQ reference configuration, respectively.

In this case, i) the NgCell#Y-related actual UL-DL configuration information, ii) the NgCell#Y-related intended UL-DL configuration information, and iii) the NgCell#Y-related DL HARQ reference configuration information may be grasped through the corresponding information signaling from the SrCell#X (or a relay UE that retransmits the corresponding information) (e.g., the configuration #8-2 of the method #8). Further, the configuration #11-4 may be limitedly applied on when the NgCell#Y (and/or SrCell#X) performs the eIMTA operation.

Configuration #11-5:

It can be defined that the D2D UE#X performs interpretation of an NgCell#Y-related D2D SIG RePool bitmap (i.e., N bits) as follows.

For example, it may be configured that in the NgCell#Y-related D2D SIG RePool bitmap, bits indicating resources (e.g., SFs) used for the D2D communication (e.g., bits set to "1") are sequentially applied in consideration of only UL SFs in the NgCell#Y-related UL-DL configuration information that is assumed by the D2D UE#X. For instance, if the NgCell#Y-related D2D SIG RePool bitmap is set to "10100", it may mean that first and third UL SFs in the NgCell#Y-related UL-DL configuration information assumed by the D2D UE#X are used for the D2D communication.

As another example, it may be configured that in the NgCell#Y-related D2D SIG RePool bitmap, the bits indicating the resources (e.g., SFs) used for the D2D communication (e.g., bits set to "1") are sequentially applied to SFs without limitation of UL SFs in the NgCell#Y-related UL-DL configuration information assumed by the D2D UE#X. For instance, if the NgCell#Y-related D2D SIG RePool bitmap is set to "10100", the first and third UL SFs in the NgCell#Y-related UL-DL configuration information assumed by the D2D UE#X are used for the D2D communication. Such a method may be interpreted as that the D2D communication is performed irrespective of usage of SFs in the NgCell#Y-related UL-DL configuration information assumed by the D2D UE#X. As a further example, if at least some (i.e., some or all) of D2D SFs indicated by the NgCell#Y-related D2D SIG RePool bitmap are defined as DL SFs in the NgCell#Y-related UL-DL configuration information assumed by the D2D UE#X, the D2D UE#X may not perform D2D communication operation by assuming that the NgCell#Y-related D2D SIG RePool bitmap is not valid or not received correctly. Alternatively, the D2D UE#X may limitedly perform the D2D communication operation only on UL SFs in the NgCell#Y-related UL-DL configuration information assumed by the D2D UE#X among the D2D SFs indicated by the NgCell#Y-related D2D SIG RePool bitmap.

Method #12

According to the method #12 of the present invention, when the D2D UE#X is an out-of-coverage UE (hereinafter named "OoC UE#X"), information assumed to apply a D2D SIG RePool bitmap can be determined according to the following configurations #12-1 to #12-4.

Configuration #12-1:

In the case of the OoC UE#X, it may assume a pre-configured or pre-signaled UL-DL configuration information to apply a D2D SIG RePool bitmap (for the out-of-coverage case). In this case, it can be defined that the UL-DL configuration information according to the configuration #12-1 is determined as a pre-configured specific UL-DL configuration information or signaled from a serving cell (before the out-of-coverage state).

Configuration #12-2:

The OoC UE#X may be configured to comply with information signaled from another D2D UE through a PD2DSCH/D2DSCH. In this case, the corresponding information may include the UL-DL configuration information (and/or the D2D SIG RePool bitmap) (for the out-of-coverage case).

Configuration #12-3:

In the case of the OoC UE#X, it may assume UL-DL configuration information of a serving cell with which the OoC UE#X maintained communication connectivity most recently to apply the D2D SIG RePool bitmap (for the out-of-coverage case). In this case, the corresponding UL-DL configuration information may be defined as i) SIB1 (or RadioResourceConfigCommonSCell IE) UL-DL configuration information, ii) actual UL-DL configuration information (associated with the eIMTA operation) or iii) DL HARQ reference configuration information (associated with the eIMTA operation).

Configuration #12-4:

It can be defined that the OoC UE#X performs interpretation of the D2D SIG RePool bitmap (for the out-of-coverage case) as follows.

For example, it may be configured that in the D2D SIG RePool bitmap (for the out-of-coverage case), bits indicating resources (e.g., SFs) used for the D2D communication (e.g., bits set to "1") are sequentially applied in consideration of only UL SFs in UL-DL configuration information assumed by the D2D UE#X. For instance, if the D2D SIG RePool bitmap (for the out-of-coverage case) is set to "10100", it may mean that first and third UL SFs in the UL-DL configuration information assumed by the D2D UE#X are used for the D2D communication.

As another example, it may be configured that in the D2D SIG RePool bitmap (for the out-of-coverage case), the bits indicating the resources (e.g., SFs) used for the D2D communication (e.g., bits set to "1") are sequentially applied to SFs without limitation of UL SFs in the UL-DL configuration information assumed by the D2D UE#X. For instance, if the D2D SIG RePool bitmap (for the out-of-coverage case) is set to "10100", the first and third UL SFs in the UL-DL configuration information assumed by the D2D UE#X are used for the D2D communication. Such a method may be interpreted as that the D2D communication is performed irrespective of usage of SFs in the UL-DL configuration information assumed by the D2D UE#X. As a further example, if at least some (i.e., some or all) of D2D SFs indicated by the D2D SIG RePool bitmap (for the out-of-coverage case) are defined as DL SFs in the UL-DL configuration information assumed by the D2D UE#X, the D2D UE#X may not perform D2D communication operation by assuming that the D2D SIG RePool bitmap (for the out-of-coverage case) is not valid or not received correctly. Alternatively, the D2D UE#X may limitedly perform the D2D communication operation only on UL SFs in the UL-DL configuration information assumed by the D2D UE#X among the D2D SFs indicated by the D2D SIG RePool bitmap (for the out-of-coverage case).

Additionally, in some or all of the aforementioned methods (i.e., methods #1 to #12) of the present invention, UL SFs in the D2D SIG TX RePool or D2D SIG RX RePool where the D2D signal transmission/reception operation is actually performed (from the perspective of a specific DeI-UE) may be limited to SFs where WAN UL signal (e.g., PUSCH, PUCCH, etc.) transmission associated with the corresponding specific DeI-UE is not performed.

Each of the aforementioned embodiments/configurations/rules/examples of the present invention can be embodied independently. And, it is possible to implement each of the aforementioned embodiments not only independently but also by combining (or merging) at least one of the embodiments.

Moreover, in this specification, the term such as "D2D (device-to-device) communication" can be interpreted as "V2X (vehicle-to-X) communication". Here, "X" may be interpreted as a vehicle (i.e., V2V), a person (i.e., V2P), an infra-structure (i.e., V2I), or the like.

Furthermore, the embodiments of the present invention can be extensively applied to i) a case where some D2D UEs participating in D2D communication are within coverage of a network and the remaining D2D UEs are out of the coverage of the network (i.e., D2D Discovery/Communication of Partial Network Coverage), ii) a case where all D2D UEs participating in the D2D communication are within the coverage of the network (i.e., D2D Discovery/Communication Within Network Coverage), and/or iii) a case where all D2D UEs participating in the D2D communication are out of the coverage of the network (i.e., D2D Discovery/Communication Outside Network Coverage (for Public Safety Only)).

Further, the embodiments of the present invention can be extensively applied not only to TYPE 1 discovery message transmission and/or Mode 2 D2D data channel transmission but also to SA transmission. In addition, the embodiments of the present invention may be configured to be limitedly applied only to discovery message transmission/D2D data channel transmission/SA transmission. Moreover, the embodiments of the present invention may be configured to be limitedly applied only to V2X communication.

Further, the embodiments of the present invention may be configured to be limitedly applied only to transmission of a specific type of discovery message/transmission of a specific mode of data. Additionally, the present invention may be configured to be limitedly applied only to D2D communication associated with Partial Network Coverage/Within Network Coverage/Outside Network Coverage.

Figure 12:
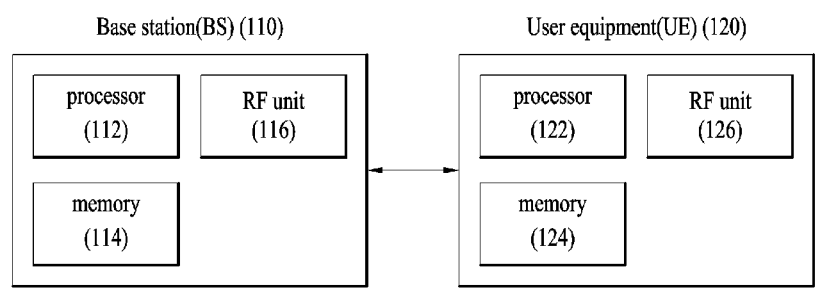
FIG. 12 illustrates a base station and a user equipment applicable to one embodiment of the present invention.

FIG. 12 is a diagram of a base station and a user equipment applicable to one embodiment of the present invention.

If a relay node is included in a wireless communication system, communication in a backhaul link is performed between a base station and the relay node and communication in an access link is performed between the relay node and a user equipment. Therefore, the base station or user equipment shown in the drawing can be substituted with the relay node in some cases.

Referring to FIG. 12, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method for transceiving signals for device-to-device (D2D) communication in a wireless communication system and apparatus therefor are mainly described with reference to examples applied to 3GPP LTE system, the method and apparatus can be applied to various kinds of wireless communication systems as well as the 3GPP LTE system.

What is claimed is:

1. A method for receiving a D2D (device-to-device) signal by a D2D UE (user equipment) in a wireless communication system, the method comprising:
   receiving resource pool information for D2D communication, wherein the resource pool information indicates a set of uplink radio resources; and
   receiving the D2D signal through specific resources from the set of uplink radio resources, depending on whether the D2D UE operates in an eIMTA (enhanced interference management for traffic adaptation) fallback mode or an eIMTA non-fallback mode;
   wherein when the D2D UE operates in the eIMTA fallback mode, the D2D signal is received through any one of the resources from the set of uplink radio resources, and
   wherein when the D2D UE operates in the eIMTA non-fallback mode, the D2D signal is received through at least one radio resource from the set of uplink radio resources that is not reconfigured for downlink use by physical layer signaling.

2. The method of claim 1, wherein the D2D signal comprises a TYPE 1 discovery message.

3. The method of claim 1, wherein the D2D signal comprises a D2D data channel based on Mode 1.

4. The method of claim 1, wherein the D2D signal comprises at least one of information on an actual uplink-downlink configuration of a serving cell associated with the D2D transmission UE, information on a downlink HARQ reference configuration of the serving cell associated with the D2D transmission UE, information on an SIB uplink-downlink configuration of the serving cell associated with the D2D transmission UE, and information on whether the serving cell associated with the D2D transmission UE performs eIMTA operation.

5. The method of claim 1, further comprising, when the D2D signal is not detected in a search window, stopping monitoring of the D2D signal during a time interval corresponding to a stop window.

6. The method of claim 1, wherein an uplink-downlink configuration of a neighbor cell is set to be identical to an actual uplink-downlink configuration of the serving cell.

7. The method of claim 1, wherein when the D2D UE is out of coverage of a serving cell, the resource pool information indicates a radio resource for the D2D communication according to a predetermined uplink-downlink configuration.

8. A D2D (device-to-device) UE (user equipment) for receiving a D2D signal in a wireless communication system, the D2D UE comprising:
   a transmitter and receiver; and
   a processor,
   wherein the processor is configured to:
   control the receiver to receive resource pool information for D2D communication, wherein the resource pool information indicates a set of uplink radio resources; and
   control the receiver to receive the D2D signal through specific resources from the set of uplink radio resources depending on whether the D2D UE operates in an eIMTA (enhanced interference management for traffic adaptation) fallback mode or an eIMTA non-fallback mode,
   wherein when the D2D UE operates in the eIMTA fallback mode, the D2D signal is received through any one of the resources from the set of uplink radio resources, and
   wherein when the D2D UE operates in the eIMTA non-fallback mode, the D2D signal is received through at least one radio resource from the set of uplink radio resources that is not reconfigured for downlink use by physical layer signaling.

* * * * *